United States Patent Office 3,486,958
Patented Dec. 30, 1969

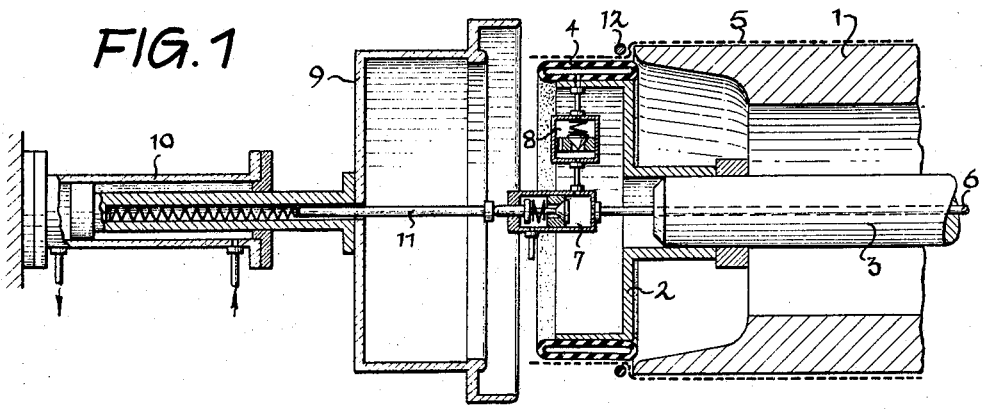
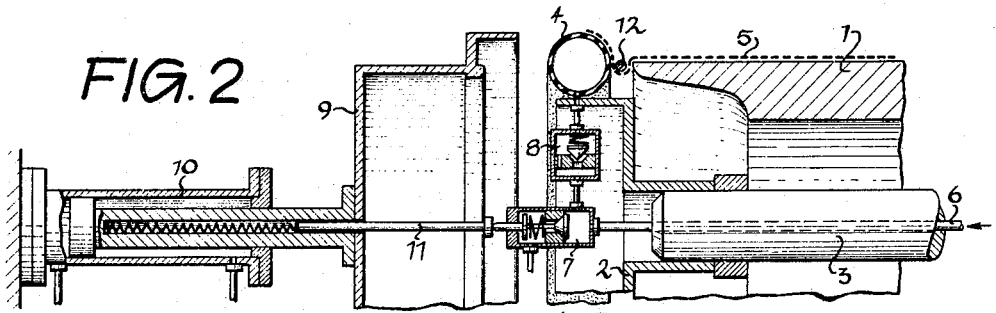
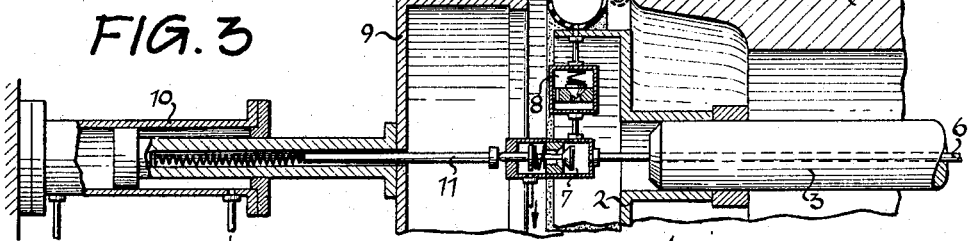
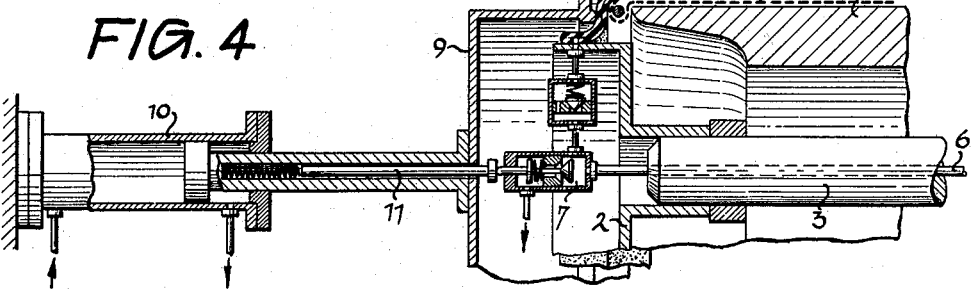

3,486,958
METHOD OF AND APPARATUS FOR BUILDING-UP PNEUMATIC TIRES
Friedrich-Carl von Waldeck, Arolsen, and Willi Sievers, Korbach, Germany, assignors to Continental Gummi-Werke Aktiengesellschaft, Hannover, Germany
Filed Sept. 14, 1966, Ser. No. 579,356
Claims priority, application Germany, Sept. 15, 1965, C 36,888
Int. Cl. B29h 17/28, 17/00
U.S. Cl. 156—132    7 Claims

ABSTRACT OF THE DISCLOSURE

During pneumatic vehicle tire manufacture a venting of rolling bellows is effected in conformity with axial movement of a folding bell provided with a tire building drum in various phases of operation during which fabric layers are folded over tire bead cores. A venting valve with a control member directly or indirectly controlled by the folding bell permits axial advance of the folding bells after rolling bellows have been inflated and then to open the venting vave, whereupon venting of the bellows starts independently of the pressure condition in the preceding connecting line. Check valves permit unimpeded supply of pressure fluid to the bellows but allow only a choked or throttled venting of the bellows.

---

The present invention relates to a method of and apparatus for building up pneumatic vehicle tires according to which the fabric layers of the tire carcass which laterally protrude beyond the bead cores are folded over said bead cores by foldable or rolling bellows on the tire building drum.

It is well known to take advantage of the expandability of inflatable rolling bellows for initiating and carrying out working operations in connection with the building up of raw tires. At the start of the tire building up operation, when the annular or torus-shaped bellows are under no pressure, said bellows rest on the end sections of the tire building drum and form a portion of the cylindrical drum wall upon which the rubberized fabric layers are placed. By inflating the said bellows, their cross section increases in radial direction so that the fabric layers which protrude ahead of the pull-resistant bead cores will be lifted off and by a subsequent axial displacement in the direction toward the central section of the drum can be folded about the cores. This axial movement is brought about by so-called folding bells from the end side of the drum while the air-filled bellows roll on the inner wall surface of the bells and while simultaneously pressing the lifted off fabric layers toward the central section of the drum expand in axial direction above the wall of the drum.

It is an object of the present invention to provide a method of and apparatus for building up pneumatic vehicle tires which will simplify the above outlined heretofore known building up of pneumatic vehicle tires.

It is a further object of this invention to provide a method of and apparatus for building up pneumatic vehicle tires which will eliminate the necessity of advancing the fully inflated bellows and rolling the same over as was heretofore done while at the same time the cross-sectional shape of said bellows was subjected to considerable changes.

These and other objects and advantages of the present invention will appear more clearly from the following specification in connection with the accompanying drawings, in which:

FIGS. 1 to 4 respectively diagrammatically illustrate an end section of a tire building drum with the folding bell pertaining thereto in various phases of the operation during which the fabric layers are folded over the bead cores.

It has been found according to the present invention that the operational steps depending on the axial movement of the rolling bellows can be considerably simplified if prior to or simultaneously with the folding back of the fabric layers, the inner pressure in the rolling bellows is reduced and for instance the said bellows are vented to atmospheric pressure in the coarse of the folding back operation. The reduction in pressure introduced in conformity with the present invention brings about an improved deforming possibility of the rolling bellows in the course of the critical building up operations and permits the advancement of said bellows at considerably reduced forces. This possibility also results in a simplified construction of the driving devices, for instance, of the axially movable folding bells.

Advantageously, the venting of the rolling bellows is effected in conformity with the axail movement of said bells so that it will be assured that the inner pressure of the bellows will have dropped to a considerably lower value when at the engagement of the bells with the rolling bellows the proper power consuming folding operation is initiated.

In conformity with the present invention, a venting valve with a control member directly or indirectly controlled by the folding bell pertaining thereto may be inserted in the connecting line conveying pressure fluid to the bellows. The operation then takes place in such a way that the folding bells advancing in axial direction after the rolling bellows have been inflated bring about the movement of the venting valve to its opening position whereupon the venting of the bellows starts independently of the pressure condition in the preceding connecting line. The venting may be stopped after the pressure in the bellows has been reduced to a desired extent while the folding movement at the thus obtained and maintained reduced pressure is continued. However, if desired, the once initiated venting may be continued until atmospheric pressure has been obtained. In order in such an instance to avoid an undesired fast collapsing of the rolling bellows, it is advantageous to provide choke check valves between the bellows and the venting valve. Such choke check valves will permit an unimpeded supply of pressure fluid to the bellows but will allow a choked or throttled venting only of said bellows.

Referring now to the drawings in detail, the tire building drum of which one portion only has been shown comprises a central section 1 which is variable in diameter in a manner well known and also comprises a rigid end section 2 at each side of said central section. The sections 1 and 2 are mounted on a shaft 3 common thereto and can be driven as a unitary body by said shaft. Each end section 2 carries an inflatable bellows 4 of rubber or rubber-like material which extends in the form of a ring around the end section and when in a pressure-less condition according to FIG. 1 forms the flat cylindrical outer wall of said end section and the direct support for the end portions of the fabric layers 5 of the raw tire. Shaft 3 is provided with an axial bore 6 adapted to be connected to a source of compressed air for selectively inflating the bellows 4 or venting the same to the atmosphere. Interposed in the conduit communicating with the bore 6 in shaft 3 are a mechanically operable venting valve 7 and a choke check valve 8. Ahead of the end face of drum 1, 2 in slightly spaced relationship thereto and coaxial therewith there is arranged a folding bell 9 at each end of the drum. Bell 9 which in the illustrated example has the shape of a stepped hollow cylinder is adapted by means of a two-chamber cylinder piston system 10 to be displaced in axial direction of the axis of the tire building drum. The inner side of bell 9 is provided with a spring-biased control bar 11 which is adapted to actuate said venting valve 7.

The operation of the apparatus according to the present invention is as follows. It is assumed that the bead cores 12 have been placed upon the fabric layers 5 on the drum and that the bead cores have been arrested in their respective position by expanding the central drum section 1. At this phase of operation, the inflatable bellows are still vented, and the folding bells 9 occupy their rest positions outside the drum (FIG. 1).

The next following working steps are directed to the folding about cores 12 of the marginal sections of the fabric layers which protrude beyond the drum end sections 2 while said folding is directed toward the central portion 1 of the building drum. To this end, compressed air is through a main valve not shown and bore 6 in shaft 3 introduced into the rolling bellows 4 so that the latter are inflated and assume the cross-sectional shape illustrated in FIG. 2 while those portions of the fabric layer 5 which are located ahead of cores 12 will be lifted. Subsequently, the folding bells 9 are moved toward the drum. Control bar 11 which is displaceably inserted in the piston rod of the cylinder piston system 10 will at the start of the advancing movement loosely engage the actuating member of the venting valve 7 and during the further advancement of said bells will at a selectable time adjust said valves so that approximately at the time bell 9 engages bellows 4 according to FIG. 3 the bellows 4 will be vented through valve 7 while bypassing bore 6 and the adjacent section of the fluid pressure conveying conduit. It is of course understood that the same operations take place for both drum end sections, i.e. also for the drum section not shown in the drawings. In view of choke check valve 8, the venting is not effected instantaneously but with an adjustable delay. Consequently, the bellows 4 deflates only gradually to its original flat cross-sectional shape. The axially advancing folding bell 9 will thus not encounter any material resistance at the bellows which progressively become softer, and the power consumption for folding over the bellows onto the folded back fabric layers 5 will be in surprisingly low limits.

During the last phase of movement, the bellows have been vented approximately to atmospheric pressure and will have the shape shown in FIG. 4. The enveloping or wrapping of the bead cores 12 is thus completed, whereupon the folding bells 9 are withdrawn and the building up of the tire can be continued in the customary manner.

It is, of course, to be understood that the present invention is, by no means, limited to the particular arrangement and method set forth above and shown in the drawings but also comprises any modifications that will appear to those skilled in the art.

What we claim is:

1. A tire building drum having a central portion and two end portions arranged on opposite ends of said central portion, shaft means common to said central portion and said end portions and supporting the same for rotation thereof, two annular compressed air inflatable folding bellows respectively located on and extending around said end portions for supporting the outer ends of fabric layers placed on said tire building drum, conduit means adapted to communicate with the interior of said bellows for selectively supplying compressed air into and releasing the same from said bellows, actuating means arranged at opposite ends of said drum and operable to engage and fold over said inflatable bellows in a direction toward said central drum portion, and valve means interposed in said conduit means and operable by said actuating means for releasing compressed air from said bellows.

2. A tire building drum according to claim 1, in which said valve means are arranged within said end portions, and in which each of said actuating means includes a control member operable at a preselected position of the respective actuating means to engage and actuate said valve means.

3. A tire building drum according to claim 1, in which said valve means includes venting valve means operable by said actuating means for venting said bellows, and also includes choke check valve means interposed between the respective bellows and the venting valve means pertaining thereto to permit a substantially unimpeded inflation but a throttled venting only of said bellows.

4. In a method of building up a pneumatic vehicle tire on a tire building drum having a central portion and two end portions respectively arranged at opposite ends of said central portion and respectively provided with compressed air inflatable folding bellows for folding marginal portions of fabric layers around bead cores on said fabric layers in a direction toward said central portion, the step of controllably releasing compressed air independently from said bellows purposely throttle vented during the folding operation of said bellows.

5. In a method of building up a pneumatic vehicle tire on a tire building drum having a central portion and two end portions respectively arranged at opposite ends of said central portion and respectively provided with compressed air inflatable folding bellows for folding marginal portions of fabric layers around bead cores on said fabric layers in a direction toward said central portion, the step of releasing compressed air from said bellows during the folding operation of said bellows, the release of compressed air from said bellows being effected gradually at the rate at which the folding operation of said bellows proceeds.

6. A method according to claim 5, in which the release of compressed air from said bellows is initiated at approximately the time at which the folding operation of said bellows is to start.

7. A method according to claim 5, in which in the course of the folding operation of said bellows the air pressure in the latter is eventually reduced to atmospheric pressure.

References Cited

UNITED STATES PATENTS

| 2,565,071 | 8/1951 | Frazier | 156—401 X |
| 2,653,645 | 9/1953 | Frazier | 156—401 |
| 2,715,931 | 8/1955 | Frazier | 156—132 |
| 3,236,715 | 2/1966 | Gunderson | 156— 285 X |
| 3,433,699 | 3/1969 | Rumble | 156—580 |
| 3,434,987 | 3/1969 | Caretta et al. | 156—132 |
| 3,438,832 | 4/1969 | Cantarutti | 156—132 X |

HAROLD ANSHER, Primary Examiner

U.S. Cl. X.R.

156—285, 312, 401